US011532473B2

(12) United States Patent
Richardson et al.

(10) Patent No.: US 11,532,473 B2
(45) Date of Patent: Dec. 20, 2022

(54) MOBILITY AND MASS MEASUREMENT USING TIME-VARYING ELECTRIC FIELDS (71) Applicant: Micromass UK Limited, Wilmslow (GB)

(72) Inventors: Keith George Richardson, Derbyshire (GB); Kevin Giles, Stockport (GB); Steven Derek Pringle, Darwen (GB); Jason Lee Wildgoose, Stockport (GB); David J. Langridge, Macclesfield (GB)

(73) Assignee: Micromass UK Limited, Wilmslow (GB)

( * ) Notice: Subject to any disclaimer, the term of this patent is extended or adjusted under 35 U.S.C. 154(b) by 361 days.

(21) Appl. No.: 16/631,874

(22) PCT Filed: Jul. 23, 2018

(86) PCT No.: PCT/GB2018/052065
§ 371 (c)(1),
(2) Date: Jan. 17, 2020

(87) PCT Pub. No.: WO2019/016571
PCT Pub. Date: Jan. 24, 2019

(65) Prior Publication Data
US 2020/0161119 A1 May 21, 2020

(30) Foreign Application Priority Data

Jul. 21, 2017 (GB) ..................... 1711795
Feb. 14, 2018 (GB) ..................... 1802422
May 31, 2018 (GB) ..................... 1808891

(51) Int. Cl.
*H01J 49/28* (2006.01)
*H01J 49/00* (2006.01)
(Continued)

(52) U.S. Cl.
CPC ............ *H01J 49/28* (2013.01); *G01N 27/623* (2021.01); *H01J 49/004* (2013.01); *H01J 49/0009* (2013.01)

(58) Field of Classification Search
CPC ...... H01J 49/28; H01J 49/0009; H01J 49/004; G01N 27/62
(Continued)

(56) References Cited

U.S. PATENT DOCUMENTS

| 6,630,662 | B1 * | 10/2003 | Loboda | ............... | G01N 27/622 |
| | | | | | 250/281 |
| 2010/0200742 | A1 * | 8/2010 | Schultz | ................... | H01J 49/16 |
| | | | | | 250/252.1 |
| 2019/0162698 | A1 * | 5/2019 | Gillig | .................. | H01J 49/4215 |

FOREIGN PATENT DOCUMENTS

| EP | 3082151 | A1 | 10/2016 |
| GB | 2525275 | A | 10/2015 |

(Continued)

OTHER PUBLICATIONS

Richardson et al. "An Improved Calibration Approach for Travelling Wave Ion Mobility Spectrometry: Robust, High-Precision Collision Cross Sections." Waters Poster. 2019.
(Continued)

*Primary Examiner* — Nicole M Ippolito
(74) *Attorney, Agent, or Firm* — Womble Bond Dickinson (US) LLP; Deborah M. Vernon (57) ABSTRACT

A method of ion mobility and/or mass spectrometry is disclosed in which the ion mobility and/or mass to charge ratio of an ion is determined using an algorithm or relationship that relates the transit time or average ion velocity of the ion through an ion separation device in which one or more time-varying electric field is used to separate ions passing therethrough to one or more parameters for the device, the
(Continued)

mass to charge ratio of the ion and the ion mobility of the ion.

23 Claims, 3 Drawing Sheets

(51) Int. Cl.
*G01N 27/62* (2021.01)
*G01N 27/623* (2021.01)

(58) Field of Classification Search
USPC .................................. 250/281, 282, 290, 291
See application file for complete search history.

(56) References Cited

FOREIGN PATENT DOCUMENTS

| | | |
|---|---|---|
| GB | 2530836 A | 4/2016 |
| GB | 2539538 A | 12/2016 |
| WO | 2011017409 A1 | 2/2011 |

OTHER PUBLICATIONS

Richardson et al. "Fundamentals of Travelling Wave Ion Mobility Revisited: Towards Universal Calibration." Waters Posters. 2018.
Richardson et al. "Fundamentals of travellling wave ion mobility revisited: I. Smoothly moving waves." Int. J. Mass Spec. 428(2018): 71-80.
Michelmann et al. "Fundamentals of Trapped Ion Mobility Spectrometry." J. Am. Soc. Mass Spectrom. 26(2015): 14-24.
Shvartsburg et al. "Fundamentals of Traveling Wave Ion Mobility Spectrometry." Anal. Chem. 80.24(2008): 9689-9699.
International Search Report and Written Opinion of PCT/GB2018/052065; completed on Oct. 31, 2018; dated Nov. 7, 2018.
Search Report issued in UK Application No. 1808891.4 dated Jan. 24, 2019.

\* cited by examiner

MOBILITY AND MASS MEASUREMENT USING TIME-VARYING ELECTRIC FIELDS

CROSS-REFERENCE TO RELATED APPLICATIONS

This application is a National Stage Application of International Application No. PCT/GB2018/052065, filed Jul. 23, 2018, which claims priority from and the benefit of United Kingdom patent application No. 1711795.3 filed on 21 Jul. 2017, United Kingdom patent application No. 1802422.4 filed on 14 Feb. 2018 and United Kingdom patent application No. 1808891.4 filed on 31 May 2018. Each of the foregoing applications is incorporated herein by reference in its entirety.

FIELD OF THE INVENTION

The present invention relates generally to ion mobility and/or mass spectrometers and in particular to such spectrometers that determine the transit times of ions through ion separation devices.

BACKGROUND

Recently, it has become more common in mass and/or ion mobility spectrometry for ion mobility separations to be performed using time-varying electric fields. The most prominent examples of such techniques are travelling wave ion mobility separation (TWIMS) and trapped ion mobility spectrometry (TIMS).

In ion mobility spectrometry utilizing time-varying electric fields, care is taken to operate the ion mobility separation device in a regime in which the transit time of the ions through the separation device (and therefore the separation of the ions) is determined predominantly by the ion mobility of the ions, at least for analyte ions of interest. In particular, ions of the same mobility (K), as determined for example using drift tube ion mobility, should have the same transit time through the device. When this condition is satisfied, it is relatively straightforward to calibrate the device to obtain reliable ion mobility measurements. When this condition is not satisfied however, the resulting transit time measurement contains a mixture of mass to charge ratio and ion mobility information contributions that cannot be disentangled straightforwardly.

SUMMARY

From a first aspect, there is provided a method of ion mobility and/or mass spectrometry comprising:

providing an ion separation device in which one or more time-varying electric field is used to separate ions passing therethrough such that the ions elute from the ion separation device at different times;

providing an algorithm or relationship that relates the transit time or average ion velocity of any given ion through the ion separation device to one or more parameters for the device, the mass to charge ratio of that ion and the ion mobility of that ion;

measuring the transit time or average ion velocity of an ion through the ion separation device; and (i) determining the ion mobility of said ion from said algorithm or relationship by using the measured transit time or average ion velocity of the ion, a known mass to charge ratio of the ion, and known parameters for the device; or (ii) determining the mass to charge ratio of said ion from said algorithm or relationship by using the measured transit time or average ion velocity of the ion, a known ion mobility of the ion, and known parameters for the device; or (iii) wherein said measuring the transit time or average ion velocity of the ion through the ion separation device is performed whilst using a first set of operating conditions of the device associated with first known parameter values to obtain a first transit time or average ion velocity, and wherein the method further comprises measuring a second transit time or average ion velocity of the ion through the ion separation device whilst using second, different operating conditions of the device associated with second known parameter values, and determining both the ion mobility and mass to charge ratio of said ion from said algorithm or relationship by using the measured first and second transit times or average ion velocities and the first and second parameter values.

The embodiments described herein may thus enable the dependence of an ion's transit time through the separation device on both its ion mobility and mass to charge ratio to be accounted for, rather than simply ignoring the dependence on ion mobility or mass to charge ratio. For example, step (i) effectively removes an unwanted mass to charge ratio dependence from the ion mobility measurement. Similarly, step (ii) effectively removes an unwanted ion mobility dependence from the mass to charge ratio measurement.

Accordingly, embodiments described herein may provide accurate ion mobility and/or mass to charge ratio measurements based on the measured transit times or average ion velocities.

It will be appreciated that the average ion velocity for any given ion is generally defined by the length of the ion separation region in the separation device divided by the transit time for that ion through the ion separation region. A measured transit time can thus readily be converted to an average ion velocity, and vice versa. For the techniques presented herein, according to any of the described embodiments and aspects, measurements of average ion velocity and transit time may therefore be used equivalently and any references herein to a measured transit time may be replaced by reference to an average ion velocity, or vice versa, as appropriate.

According to embodiments, an algorithm or relationship is used that relates the transit time or average ion velocity of any given ion through the ion separation device to one or more parameters for the device, the mass to charge ratio of that ion and the ion mobility of the ion. The parameters for the device used in the algorithm or relationship may comprise operational parameters of the device. For instance, the parameters may represent operational parameters that relate to properties of the one or more time-varying field, such as the amplitude or rate of change of the electric field, and/or relate to other operational parameters that affect the forces on the ions in the ion separation device, such as a gas flow velocity. These operational parameters may generally be known, or at least may be determined, where the device is sufficiently well characterised. In other cases, the operational parameters may be determined and fitted experimentally. On the other hand, where the operating parameters of the device are not sufficiently well known and cannot be sufficiently well characterised, the parameter values used in the algorithm or relationship may comprise fitted calibration coefficients, for example as suitably determined through one or more prior calibration experiments. In this case, although the parameter values will generally depend on the operating conditions within the device, the parameter values may not directly relate to any particular operating parameters of the device but instead comprise coefficients (or constants) of the algorithm or relationship that have been determined and fitted experimentally.

That is, the parameters for the device used in the algorithm or relationship may generally comprise any of known operational parameters, fitted operational parameters or fitted calibration coefficients, e.g. depending on the form of the algorithm or relationship. Regardless of the form of the algorithm and relationship, and regardless of how the parameters for the device are determined, the algorithm and relationship can be used in all cases in essentially the same way either to determine ion mobility given the mass to charge ratio as in step (i), to determine the mass to charge ratio given the ion mobility as in step (ii), or to determine both the ion mobility and mass to charge ratio as in step (iii).

The steps of determining the ion mobility and/or mass to charge ratio from the algorithm or relationship may be performed by an ion mobility and/or mass spectrometer performing the above method. The spectrometer may have an interface in which said known ion mobility and/or known mass to charge ratio may be input, or the spectrometer may measure the ion mobility and/or mass to charge ratio of the ion in order to obtain the known ion mobility and/or known mass to charge ratio. Alternatively the known ion mobility and/or known mass to charge ratio may be provided to post acquisition processing software.

For step (i) above, where the mass to charge ratio of the ion and the operational parameters for the device are known and fixed, the only unknowns (or variables) in the algorithm or relationship may be the ion mobility and transit time or average ion velocity of the ion. Thus, by measuring the transit time or average ion velocity of the ion it is possible to determine the ion mobility. Similarly, for step (ii) above, the only unknowns in the algorithm or relationship may be the mass to charge ratio and transit time or average ion velocity of the ion, so that it is then possible to determine the mass to charge ratio from a measurement of the transit time or average ion velocity. Similarly, for step (iii) above, the transit time or average ion velocity, ion mobility and mass to charge ratio may all be unknown. So, by performing multiple measurements of the transit time or average ion velocity using different, known values for the parameters for the device the ion mobility and mass to charge ratio may thus be determined.

The method may comprise measuring the mass to charge ratio of the ion to determine said known mass to charge ratio in step (i); or measuring the ion mobility of the ion to determine said known ion mobility in step (ii). This may be performed as part of the method using the same instrument.

For example, the method may be performed on a tandem ion mobility mass spectrometer and said mass to charge ratio and/or ion mobility is measured using the spectrometer to obtain said known mass to charge ratio and/or known ion mobility.

However, it is also contemplated that the measurements of mass to charge ratio or ion mobility used to determine the known values for use in steps (i) and (ii) may be performed at different times to the measurements of the ion transit times or average ion velocities, or using several devices operating in parallel.

The method may comprise, in step (iii), determining a first equation relating the first transit time or average ion velocity, the first known parameter values, the ion mobility of the ion, and the mass to charge ratio of the ion; determining a second equation relating the second transit time or average ion velocity, the second known parameter values, the ion mobility of the ion, and the mass to charge ratio of the ion; and solving said first and second equations simultaneously to determine the ion mobility and mass to charge ratio of said ion.

The first and second measurements are made under different operating conditions of the device. Typically this means that the measured first and second transit times or average ion velocities will be different (although this is not necessarily the case—for instance, in some cases the transit times or average ion velocities may be the same under both sets of operating conditions but the measurements are still influenced differently e.g. by velocity relaxation. This may be the case for example when simultaneously scaling both the scaling wave velocity and voltage in a travelling wave device by a similar factor). Thus, the first and second known parameter values are different for the two measurements such that a first equation can be derived using the algorithm or relationship for the first parameter values and a second equation derived for the second parameter values. The equations can then be solved simultaneously to give both the ion mobility and mass to charge ratio of the ion.

It will be appreciated that step (iii) may comprise performing any number of measurements under different operating conditions. For example, the method may comprise measuring the transit time or average ion velocity whilst using a third or further set of operating conditions of the device associated with third or further known parameter values to obtain a third or further transit time or average ion velocity, and the ion mobility and mass to charge ratio of the ion may then be determined also using the third or further transit times or average ion velocities and parameter values for the device.

In general, in all cases, according to any of the aspects and embodiments described herein, when referring to multiple measurements, e.g. multiple measurements made under different operating conditions, it will be appreciated that these measurements may be repeat experiments in a single device, or measurements made by several devices working in parallel.

From a second aspect the present invention provides a method of calibrating an ion mobility and/or mass spectrometer comprising:

providing an ion separation device in which one or more time-varying electric field is used to separate ions passing therethrough such that the ions elute from the ion separation device at different times;

providing an algorithm or relationship that relates the transit time or average ion velocity of any given ion through the ion separation device to one or more parameters for the device, the mass to charge ratio of that ion and the ion mobility of that ion;

measuring the transit time or average ion velocity of an ion through the ion separation device; and determining the parameter values for the device from said algorithm or relationship by using the measured transit time or average ion velocity of the ion, a known ion mobility of the ion, and a known mass to charge ratio of the ion.

That is, from measurements of the transit time or average ion velocity of an ion through the ion separation device, in combination with the known ion mobility and mass to charge ratio of that ion, it is possible to determine the appropriate form of the algorithm or relationship for characterising the device. Particularly, it is possible to determine the appropriate operating parameters or calibration coefficients for use in the algorithm or relationship so that the device can be appropriately calibrated for subsequent measurements.

The calibration method may comprise steps of measuring both the mass to charge ratio and ion mobility of the ion to determine said known mass to charge ratio and known ion mobility. Alternatively, the mass to charge ratio and ion mobility of the ions used for the calibration may already be known. For example, measurements may be performed using standard calibrant ions having known mass to charge ratio and ion mobility.

According to any of the methods disclosed herein, the ion separation device may be a travelling wave separation device, wherein voltages are successively applied to electrodes of the device so as to form a wave of potential barriers that move in a first direction along the device so as to urge ions in the first direction through a gas.

In this case, the algorithm or relationship may be or may comprise a term of the form:

$$T = \frac{L}{\mu(1 - \omega_0 - \alpha^2 \omega_0^2 (1 - \omega_0))}$$

where T is the transit time of any given ion through the ion separation device, L is the length of the ion separation region in the device, p is the velocity in the first direction of the potential barriers, $$\omega_0 = \sqrt{1 - \gamma^2}, \; \alpha = \frac{2\pi\mu}{\lambda} K \frac{m}{q}, \; \gamma = \frac{2\pi V_0}{\mu\lambda} K,$$

where $V_0$ is the amplitude of each potential barriere, $\lambda$ is the wavelength between adjacent potential barriers of said wave of potential barriers, K is the ion mobility of the ion, and m/q is the mass to charge ratio of the ion.

When dependent on the second aspect, the step of determining the parameters for the device may comprise determining one or more operational parameters for the device such as: $\mu$; L; $\lambda$; $V_0$; $\mu$/L; $\mu/\lambda$; or $V_0/(\mu\lambda)$.

As another example, the algorithm or relationship may be or may comprise a term of the form:

$$\bar{v}_{ion} = c_2 K^2 + c_{42} K^4 \left(\frac{m}{q}\right)^2 + c_4 K^4 + c_6 K^6; \; \text{or}$$

$$\bar{v}_{ion} = c_2 K^{2/3} + c_4 K^{4/3} + c_6 K^{6/3} + c_8 K^{8/3} + c_{82} K^{8/3} \left(\frac{m}{q}\right)^2$$

where $v_{ion}$ is the average ion velocity through the separation device defined by the length L of the ion separation region in the separation device divided by the transit time T of any given ion through the ion separation region; $c_n$ are constants; K is the ion mobility of the ion, and m/q is the mass to charge ratio of the ion.

In this example, the step of determining the parameters for the device according to the second aspect may then comprise determining the constants $c_n$. The constants $c_n$ may thus be fitted using experimental data.

In other embodiments, the ion separation device may be a trapped ion mobility separation device, wherein a gas flow urges ions in one direction, and a first electric field urges the ions in the opposite direction so as to trap the ions in a first region, and the first electric field is varied with time so that different ions elute from the first region at different times.

The ions elute may from the first region at different times into a second region in which a second electric field is maintained, wherein the second electric field is varied with time.

In this case, the algorithm or relationship may be or may comprise a term of the form:

$$T = \frac{1}{\beta}\left(F_0 - \frac{v_g}{K}\right) + \alpha' + \sqrt{\frac{2L_p}{\beta K}} - \alpha'^2$$

where T is the transit time of any given ion through the ion separation device, $\beta$ is the rate of change of the second electric field in the second region, $E_0$ is the initial value of the second electric field in the second region, $v_g$ is the velocity of the gas flow, K is the ion mobility of the ion, $\alpha'$ is the product of the ion mobility and mass to charge ratio of the ion, and $L_p$ is the length of the second region.

The step of determining the parameters for the device according to the second aspect may thus comprise determining one or more operational parameters for the device such as: $E_0$; $\beta$; $v_g$; $L_p$; $E_0/\beta$; $v_g/\beta$; or $L_p/\beta$.

The algorithm or relationship described above relates the transit time or average ion velocity of any given ion to (among other things) the mass to charge ratio of that ion. In this way, it is possible to account for velocity relaxation, and other mass to charge ratio dependent, effects.

However, in some cases, there may be other mass and/or charge dependent effects that affect the transit time or average ion velocity that are not purely dependent on mass to charge ratio. For example, when ions are confined radially within the device using RF fields, the radial distribution of ions within the device will typically depend on some other function of mass and charge.

Thus, in embodiments, the algorithm or relationship may further relate the transit time or average ion velocity of any given ion through the ion separation device to a function of mass and charge of the ion (wherein the function is not necessarily dependent on the mass to charge ratio of the ion).

For example, the algorithm or relationship relating the transit time or average ion velocity of any given ion through the ion separation device to the mass and charge of the ion may include a term of the form $e^{cm^a/q^b}$, wherein m is the mass of the ion, q is the charge of the ion and a, b and c are free parameters. For instance, any of the equations presented above for average ion velocity may suitably be multiplied by such a term, e.g. such that the transit time or average ion velocity is proportional to this term (or at least such that the algorithm or relationship includes a term that is proportional to this term).

The parameters a, b and c may thus be fitted experimentally, or suitably calibrated according to the second aspect. One or more of a, b and c may be fixed in advance of fitting or calibration. For example, b may be fixed to b=1. The parameters a, b and c may each take any sign. c and at least one of a and b may be constrained to be non-zero.

Including this term may provide improved calibrations as part of the second aspect. Alternatively, when such a term is included as part of the first aspect, such that the algorithm or relationship includes other functions of mass and charge (not just mass to charge ratio) it may be possible to determine a value of the function of mass and charge, or even the mass and charge, of the ion, and in embodiments a value of the function of mass and charge, or the mass and charge, of the ion may thus be determined in step (iii) above.

Alternatively, or additionally, in some embodiments a separate measurement of the mass (or charge) of the ion may be performed. For instance, in embodiments, the method according to the first aspect may comprise determining the mass of the ion additionally to the determination of the mass to charge ratio, and using the determined mass in combination with the mass to charge ratio to determine the charge of the ion. (Similarly, an independent measurement of the charge of the ion may be used in combination with a measurement of mass to charge ratio to determine the mass of the ion.)

In embodiments, determining the mass of the ion may comprise measuring the ion mobilities for the ion through three or more gases of different polaris ability and then determining the mass of the ion using a (known) relationship or algorithm relating the measured ion mobilities for the three or more gases to the mass of the ion. For example, an independent measurement of the mass of an ion may be made using the techniques substantially as described in United Kingdom Patent No. 2539538 (MICROMASS UK LIMITED).

It will be appreciated that the techniques described in United Kingdom Patent No. 2539538 (MICROMASS UK LIMITED) primarily relate to drift tube ion separation devices. Thus, in order to apply such techniques to ion separation devices where velocity relaxation effects are significant, the techniques described there may need to be modified appropriately. For instance, in the case that velocity relaxation effects within the device are significant, there may then be an additional unknown due to the mass to charge ratio dependence of the velocity relaxation.

Thus, in embodiments, a plurality of measurements may be performed with two or more different gases in the device, wherein the measurements performed with at least one of the gases (and optionally with each or two or more of the gases) are performed using two or more different operating conditions of the device, i.e. different operating conditions associated with different parameters for the device. For example, the measurements with at least one of the gases may also be performed with different properties of the one or more time-varying field, or differences in other conditions that influence the ions travelling through the device. In this way, it may be possible to determine not only the mass to charge ratio of the ion but also the mass and charge, or the value of some other function of mass and charge, of the ion.

As discussed above, in some operating regimes, it may be necessary to account for mass and charge dependent effects that are not purely dependent on mass to charge ratio. These effects may for example relate to the radial distribution of ions within an RF confining field. In some cases, these effects may even dominate the velocity relaxation, so that it is not necessary to include mass to charge ratio terms in the algorithm or relationship but that it may be desirable to include other functions of mass and charge.

Thus, more generally, according to embodiments of the present invention, the algorithm or relationship may relate the transit time or average ion velocity of any given ion through the ion separation device to one or more parameters for the device, the ion mobility of that ion and some function of the mass and charge of that ion.

Thus, from a third aspect there is provided a method of ion mobility and/or mass spectrometry comprising:

providing an ion separation device in which one or more time-varying electric field is used to separate ions passing therethrough such that the ions elute from the ion separation device at different times;

providing an algorithm or relationship that relates the transit time or average ion velocity of any given ion through the ion separation device to one or more parameters for the device, the ion mobility of that ion and a function of mass and charge of that ion;

measuring the transit time or average ion velocity of an ion through the ion separation device; and (i) determining the ion mobility of said ion from said algorithm or relationship by using the measured transit time or average ion velocity of the ion, a known value of the function of mass and charge of the ion, and known parameters for the device; or (ii) determining a value for the function of mass and charge of said ion from said algorithm or relationship by using the measured transit time or average ion velocity of the ion, a known ion mobility of the ion, and known parameters for the device; or (iii) wherein said measuring the transit time or average ion velocity of the ion through the ion separation device is performed whilst using a first set of operating conditions of the device associated with first known parameter values to obtain a first transit time or average ion velocity, and wherein the method further comprises measuring a second transit time or average ion velocity of the ion through the ion separation device whilst using second, different operating conditions of the device associated with second known parameter values, and determining both the ion mobility and a value for the function of mass and charge of said ion from said algorithm or relationship by using the measured first and second transit times or average ion velocities and the first and second parameter values.

Similarly, calibration methods may be performed using functions of mass and charge that are not necessarily dependent on mass to charge ratio.

Thus, from a fourth aspect there is provided a method of calibrating an ion mobility and/or mass spectrometer comprising:

providing an ion separation device in which one or more time-varying electric field is used to separate ions passing therethrough such that the ions elute from the ion separation device at different times;

providing an algorithm or relationship that relates the transit time or average ion velocity of any given ion through the ion separation device to one or more parameters for the device, a function of mass and charge of that ion and the ion mobility of that ion;

measuring the transit time or average ion velocity of an ion through the ion separation device; and determining the parameter values for the device from said algorithm or relationship by using the measured transit time or average ion velocity of the ion, a known ion mobility of the ion, and a known value of the function of mass and charge of the ion.

The function of mass and charge may generally comprise any suitable function that has some dependence on mass and charge. For example, in embodiments, in a similar manner as described above, a term of the general form $e^{cm^a/q^b}$, may suitably be included in the algorithm or relationship, wherein m is the mass of the ion, q is the charge of the ion and a, b and c are free parameters. In embodiments, b is fixed to b=1.

The function of mass and charge may thus comprise a function of the general form $m^a/q$ or $m^a/q^b$. From this, it may then be possible according to the third aspect to determine a value of the function of mass and charge (e.g. a value of $m^a/q$ or $m^a/q^b$). In some cases, e.g. by performing a plurality of measurements of transit time or average ion velocity, it may be possible to determine values of mass and charge. Similarly, according to the fourth aspect, the device may be calibrated using a known value of the function of mass and charge or known values of mass and charge.

It will be appreciated that the algorithm or relationship for the third and fourth aspects may also generally comprise mass to charge ratio dependent terms. That is, the function of mass and charge may also comprise a function of mass to charge ratio. Indeed, in general, the methods according to the third and fourth aspects may comprise any of the features described above in relation to the first and second aspects, at least to the extent that they are not mutually exclusive.

The invention also provides an ion mobility and/or mass spectrometer configured to perform a method substantially as described herein in relation to the invention according to any of its aspects and embodiments.

For instance, the first aspect of the invention also provides an ion mobility and/or mass spectrometer comprising:

an ion separation device comprising electrodes, at least one voltage supply connected to the electrodes for generating one or more electric field in the device, and an ion detector;

a memory for storing an algorithm or relationship that relates the transit time or average ion velocity of any given ion through the ion separation device to one or more parameters for the device, the mass to charge ratio of that ion and the ion mobility of that ion;

a processor having access to said memory; and a controller configured to:

control said one or more voltage supply so as to vary the electric field with time so as to separate ions passing through the device such that the ions have different transit times through the device to the detector;

measure the transit time or average ion velocity of an ion through the ion separation device using the detector; and control said processor so as to:

(i) determine the ion mobility of said ion from said algorithm or relationship by using the measured transit time or average ion velocity of the ion, a known mass to charge ratio of the ion, and known parameters for the device; or (ii) determine the mass to charge ratio of said ion from said algorithm or relationship by using the measured transit time or average ion velocity of the ion, a known ion mobility of the ion, and known parameters for the device; or (iii) wherein said controller is configured to measure the transit time or average ion velocity of the ion through the ion separation device whilst using a first set of operating conditions of the device associated with first known parameter values so as to obtain a first transit time, to measure a second transit time of the ion through the ion separation device whilst using second, different operating conditions of the device associated with second known parameter values, and determine both the ion mobility and mass to charge ratio of said ion from said algorithm or relationship by using the measured first and second transit times and the first and second parameter values.

The second aspect of the invention also provides an ion mobility and/or mass spectrometer comprising:

an ion separation device comprising electrodes, at least one voltage supply connected to the electrodes for generating one or more electric field in the device, and an ion detector;

a memory for storing an algorithm or relationship that relates the transit time or average ion velocity of any given ion through the ion separation device to one or more parameters for the device, the mass to charge ratio of that ion and the ion mobility of that ion;

a processor having access to said memory; and a controller configured to:

control said one or more voltage supply so as to vary the electric field with time so as to separate ions passing through the device such that the ions have different transit times through the device to the detector;

measure the transit time or average ion velocity of an ion through the ion separation device using the detector; and control said processor so as to determine the parameter values for the device from said algorithm or relationship by using the measured transit time or average ion velocity of the ion, a known ion mobility of the ion, and a known mass to charge ratio of the ion.

The third aspect of the invention also provides an ion mobility and/or mass spectrometer comprising:

an ion separation device comprising electrodes, at least one voltage supply connected to the electrodes for generating one or more electric field in the device, and an ion detector;

a memory for storing an algorithm or relationship that relates the transit time or average ion velocity of any given ion through the ion separation device to one or more parameters for the device, a function of mass and charge of that ion and the ion mobility of that ion;

a processor having access to said memory; and a controller configured to:

control said one or more voltage supply so as to vary the electric field with time so as to separate ions passing through the device such that the ions have different transit times through the device to the detector;

measure the transit time or average ion velocity of an ion through the ion separation device using the detector; and control said processor so as to:

(i) determine the ion mobility of said ion from said algorithm or relationship by using the measured transit time or average ion velocity of the ion, a known value of the function of mass and charge of the ion, and known parameters for the device; or (ii) determine a value of the function of mass and charge of said ion from said algorithm or relationship by using the measured transit time or average ion velocity of the ion, a known ion mobility of the ion, and known parameters for the device; or (iii) wherein said controller is configured to measure the transit time or average ion velocity of the ion through the ion separation device whilst using a first set of operating conditions of the device associated with first known parameter values so as to obtain a first transit time, to measure a second transit time of the ion through the ion separation device whilst using second, different operating conditions of the device associated with second known parameter values, and determine both the ion mobility and a value of the function of mass and charge of said ion from said algorithm or relationship by using the measured first and second transit times and the first and second parameter values.

The fourth aspect of the invention also provides an ion mobility and/or mass spectrometer comprising:

an ion separation device comprising electrodes, at least one voltage supply connected to the electrodes for generating one or more electric field in the device, and an ion detector;

a memory for storing an algorithm or relationship that relates the transit time or average ion velocity of any given ion through the ion separation device to one or more parameters for the device, a function of mass and charge of that ion and the ion mobility of that ion;

a processor having access to said memory; and a controller configured to:

control said one or more voltage supply so as to vary the electric field with time so as to separate ions passing through the device such that the ions have different transit times through the device to the detector;

measure the transit time or average ion velocity of an ion through the ion separation device using the detector; and control said processor so as to determine the parameter values for the device from said algorithm or relationship by using the measured transit time or average ion velocity of the ion, a known ion mobility of the ion, and a known value of the function of mass and charge mass and charge of the ion.

The spectrometer may be configured to perform any of the methods described herein in relation to the first, second, third or fourth aspects of the present invention.

The spectrometers described herein may be tandem ion mobility mass spectrometers.

The spectrometers described herein may comprise an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; and (xxx) a Low Temperature Plasma ("LTP") ion source.

The spectrometer may comprise one or more continuous or pulsed ion sources.

The spectrometer may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage may have a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The spectrometer may comprise a chromatography or other separation device upstream of an ion source. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide may be maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

Analyte ions may be subjected to Electron Transfer Dissociation ("ETD") fragmentation in an Electron Transfer Dissociation fragmentation device. Analyte ions may be caused to interact with ETD reagent ions within an ion guide or fragmentation device.

A chromatography detector may be provided, wherein the chromatography detector comprises either:

a destructive chromatography detector optionally selected from the group consisting of (i) a Flame Ionization Detector (FID); (ii) an aerosol-based detector or Nano Quantity Analyte Detector (NQAD); (iii) a Flame Photometric Detector (FPD); (iv) an Atomic-Emission Detector (AED); (v) a Nitrogen Phosphorus Detector (NPD); and (vi) an Evaporative Light Scattering Detector (ELSD); or a non-destructive chromatography detector optionally selected from the group consisting of: (i) a fixed or variable wavelength UV detector; (ii) a Thermal Conductivity Detector (TCD); (iii) a fluorescence detector; (iv) an Electron Capture Detector (ECD); (v) a conductivity monitor; (vi) a Photoionization Detector (PID); (vii) a Refractive Index Detector (RID); (viii) a radio flow detector; and (ix) a chiral detector.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

The electrodes may comprise electrodes which are formed on a printed circuit board, printed wiring board or an etched wiring board. For example, according to various embodiments the electrodes may comprise a plurality of traces applied or laminated onto a non-conductive substrate. The electrodes may be provided as a plurality of copper or metallic electrodes arranged on a substrate. The electrodes may be screen printed, photoengraved, etched or milled onto a printed circuit board or equivalent. According to an embodiment the electrodes may comprise electrodes arranged on a paper substrate impregnated with phenolic resin or a plurality of electrodes arranged on a fibreglass mat impregnated within an epoxy resin. More generally, the electrodes may comprise one or more electrodes arranged on a non-conducting substrate, an insulating substrate or a plastic substrate. According to embodiments the plurality of electrodes may be arranged on a substrate.

A plurality of insulator layers may be interspersed or interleaved between an array of electrodes. The plurality of electrodes may be arranged on or deposited on one or more insulator layers.

Ion mobility spectrometers utilizing time dependent electric fields (e.g. travelling wave ion mobility spectrometers) produce ion transit times that are to some extent dependent on the mass to charge ratio of the ions (independently of their ion mobility). Embodiments disclosed herein either remove this unwanted dependence, thus improving the mobility measurements, or exploit it to measure both the mass to charge ratio and ion mobility of the ion.

BRIEF DESCRIPTION OF THE DRAWINGS

Various embodiments will now be described, by way of example only, and with reference to the accompanying drawings in which.

DETAILED DESCRIPTION

Embodiments of the present invention relate to mass and/or ion mobility spectrometry in which ion mobility separations are performed using time-varying electric fields. The most prominent examples of such techniques are travelling wave ion mobility separation (TWIMS) and trapped ion mobility spectrometry (TIMS), although other suitable techniques of ion mobility separation using time-varying electric fields are also within the scope of the present invention.

In TWIMS ions are introduced into an ion mobility separation region containing a gas (e.g. a static gas). The ions may be pulsed into this separation region at an entrance end. A travelling wave is then applied along the separation region, moving in a direction from the entrance end to an exit end of the separation region. The travelling wave is a DC potential barrier, such as a potential hill, that is moved along the separation region from the entrance end to the exit end. This may be achieved by arranging a series of electrodes between the entrance and exit ends of the separation region, applying one or more DC voltage to the electrodes so as to form the DC potential barrier, and then varying the electrodes to which the one or more DC voltage is applied such that the DC potential barrier moves along the separation region from the entrance to the exit. The moving DC potential barrier urges the ions through the gas in the separation region towards the exit end of the separation region, whereas collisions between the ions and the gas resist motion of the ions towards the exit. The effectiveness with which a given ion is driven towards the exit is therefore dependent on the mobility of that ion through the gas. The higher the mobility of an ion through the gas, the faster the ion can travel through the gas and so the greater the duration of time that the ion is urged through the separation region before the DC potential barrier passes the ion. Therefore, different ions become separated along the device according to their ion mobility.

Multiple DC potential barriers are sequentially travelled from the entrance end to the exit end of the separation region. The parameters of the DC potential may be selected such that each ion having a mobility in a range of interest would be passed by the DC travelling potentials multiple times as it travels from the entrance end to the exit end of the separation region, i.e. the ion would roll over multiple DC potential barriers. This may be achieved, for example, by selecting an appropriate speed and voltage amplitude for the DC potential barrier.

Trapped ion mobility spectrometry (TIMS) is an ion separation technique in which a gas flow urges ions in a first direction and a DC electric field is applied in the opposite direction so as to hold ions stationary against the moving gas flow in a first region. Ions are initially trapped in this region by the opposing forces due to the gas flow and the electric field. After an ion accumulation period, further ions may be prevented from entering the first region. The magnitude of the electric field may then be varied with time, e.g. by scanning or stepping. As the force on the ions due to the gas flow depends on the mobility of the ions, varying the magnitude of the electric field with time results in the ions eluting from the first region in order of their mobility. The ions may elute from the first region into a second region, which may also have an electric field that varies with time.

However, in ion mobility separations employing time-dependent electric fields E(t), such as for example those described above, it cannot be assumed that ions reach and remain at their drift velocity (i.e. K E(t)) during the experiment, i.e. as they pass through the separation region. Rather, ions will have an instantaneous velocity that differs from their perfect instantaneous "drift" velocity by an amount that depends on their mass to charge ratio. The transit time of any given ion from the entrance to the exit of the separation region will therefore be dependent on both the mass to charge ratio and ion mobility of the ion. Thus, a difference between drift tubes and ion mobility separations in time-dependent electric fields is the presence of mass to charge ratio dependent velocity relaxation effects.

Figure 1:
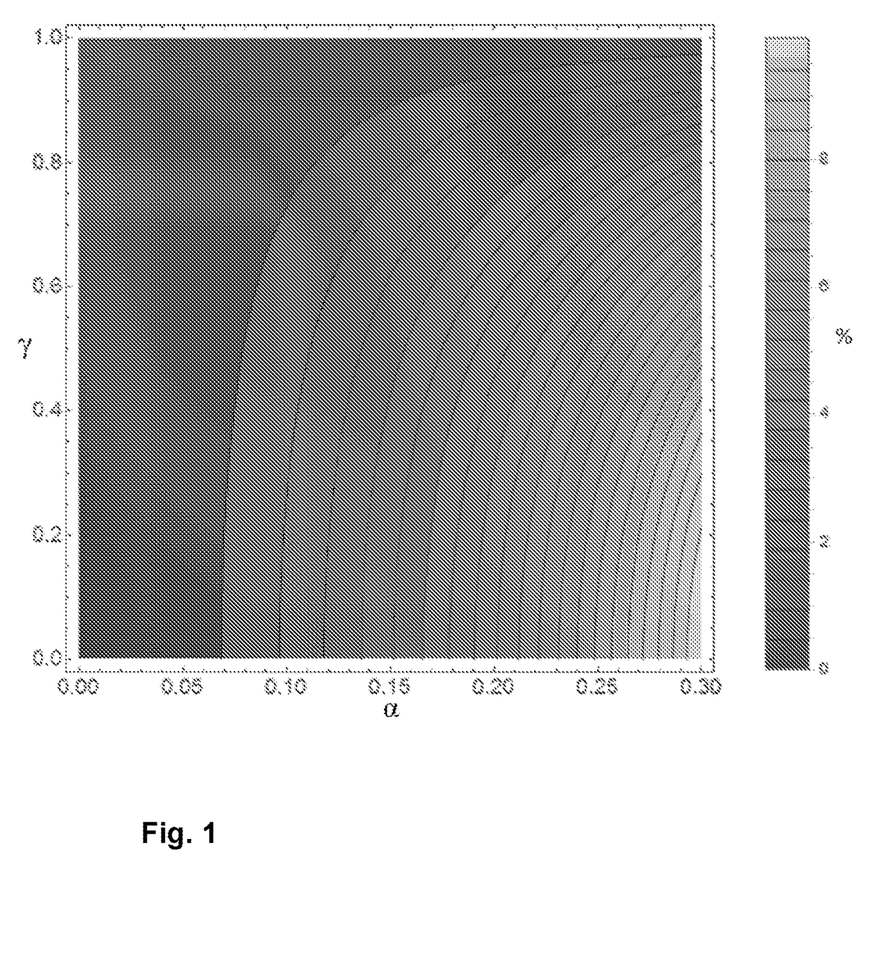
FIG. 1 shows the percentage change in velocity of an ion through an ion separation device, resulting from its dependence on mass to charge ratio, as a function of operational parameters $\alpha$ and $\gamma$ of the device.

FIG. 1 shows the percentage change in velocity of an ion through the ion separation region, resulting from its dependence on mass to charge ratio, as a function of $\alpha$ and $\gamma$. The average ion velocity is generally reduced by relaxation effects, with the relaxation effects being largest for ions with high $\alpha$ and low $\gamma$.

It is known to operate a travelling wave device under conditions such that the transit time of an ion through the device has a significant dependence on mass to charge. However, in such devices the measured transit time of an ion is still somewhat dependent on its ion mobility. Travelling wave devices are also known that operate under conditions such that the transit time of an ion through the device has a significant dependence on ion mobility and the dependence on mass to charge ratio is minimized. However, the measured transit time of an ion is still somewhat dependent on both its mass to charge ratio. In both of the above cases, the residual dependence of the ion transit time on either ion mobility or mass to charge ratio, respectively, has conventionally been ignored for the purposes of calibration and for the mass or mobility measurement, respectively.

Embodiments of the present invention seek to account for the dependence on both ion mobility and mass to charge ratio in the measurement of the ion transit time.

As described above, in a TWIMS device, DC potential barriers are sequentially moved from an entrance end to an exit end of the separation region. An embodiment is now considered in which the multiple travelling DC potential wells are in the form of sinusoidal waves that move smoothly and continuously through the separation region at a constant velocity. If the device is operated under conditions such that the transit time of the ions through the separation region has a weak dependence on mass to charge ratio (and a high dependence on ion mobility through the gas), then the approximate transit time T of an ion through the separation region can be expressed as:

$$T = \frac{L}{\mu(1 - \omega_0 - \alpha^2\omega_0^2(1 - \omega_0))} \quad \text{(Eq. 1)}$$

where $\omega_0 = \sqrt{1 - \gamma^2}$, $$\alpha = \frac{2\pi\mu}{\lambda}K\frac{m}{q}, \gamma = \frac{2\pi V_0}{\mu\lambda}K,$$

where L is the length of the separation region, $\alpha$ and $\gamma$ are two dimensionless quantities that parameterize the behaviour of an ion in the device, $\mu$ is the travelling wave velocity, $\lambda$ is the wavelength, $V_0$ is the amplitude of the travelling wave potential on axis and K is the ion mobility.

It is also possible to calculate an expression for the approximate transit time of an ion through the separation region that accounts for stronger mass to charge dependence than Eq. 1 above. For example, the following expression (calculated to order $\alpha^4$) accounts for stronger mass to charge dependence than Eq. 1 above:

$$T = \frac{L}{\mu(1 - \omega_0)(1 - \alpha^2\omega_0^2 - \alpha^4\omega_0^2(2 + 3\omega_0 - 6\omega_0^2))} \quad \text{(Eq. 2)}$$

Similarly, it is possible to continue this calculation to calculate successive corrections to higher orders of $\alpha$, such as order $\alpha^6$ and so on.

It can also be shown that, in the absence of velocity relaxation effects (i.e. $\alpha=0$), the average ion velocity (L/T) in a TWIM device can be written in the form:

$$\bar{v}_{ion} = \mu - \frac{\lambda}{\int_0^\lambda \frac{dX}{\mu - KE(X)}}$$

where E(X) is the travelling wave electric field over one wavelength (0≤X<λ) at a fixed point in time (for example at the start of the experiment).

This can be written as an expansion in powers of ion mobility, K:

$$\bar{v}_{ion} = c_2 K^2 + c_3 K^3 + c_4 K^4 \ldots$$

where $c_n$ are constants involving integrals over integer powers of the electric field E(X). Where the details of the electric field and travelling wave properties and/or other characteristics of the instrument are sufficiently well known, or suitable approximations can be made, these constants can be determined analytically.

For small enough γ, this equation can be truncated to give useful approximate expressions for the average ion velocity. For symmetric travelling waves, the coefficients of the odd powers ($c_3$, $c_5$, ...) disappear. For simplicity, the following is restricted to consideration of symmetric travelling waves (such as those employed in current commercial TWIMS devices), but the results below also have appropriate generalisations in asymmetric cases.

When the details of the electric field and travelling wave properties and/or other characteristics of the instrument are not sufficiently well known, the above expansion can be used as the basis of a calibration, wherein the coefficients $c_n$ are fitted to experimental data. In particular, the form:

$$\bar{v}_{ion} = c_2 K^2 + c_4 K^4 + c_6 K^6 \quad \text{(Eq. 3)}$$

will produce reasonable calibrations (typically with accuracies better than 1%), e.g. for small drug-like molecules under typical TWIMS conditions. In order to determine the values of the constants $c_n$, several (e.g. at least three, but preferably many more) experimental measurements of average ion velocities of species with known ion mobilities are required. When larger molecules such as denatured and native proteins are analysed however, the errors may become larger. By expanding Eq. 1 or Eq. 2 in powers of K, we find that the simplest improvement to Eq. 3 for sinusoidal waves is of the form:

$$\bar{v}_{ion} = c_2 K^2 + c_{42} K^4 \left(\frac{m}{q}\right)^2 + c_4 K^4 + c_6 K^6 \quad \text{(Eq. 4)}$$

Here, coefficient $c_{42}$ is associated with four powers of K, and two powers of m/q, hence the subscript "42". It will be appreciated that, in general, other combinations of a power of K and a power of m/q may also or instead appear, and that c may be suitably represented by a matrix of coefficients.

Figure 2A:
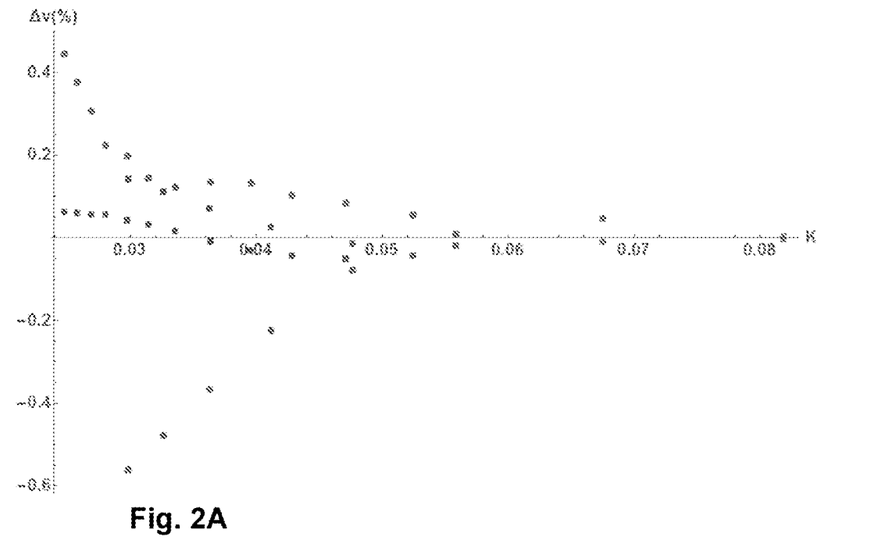
FIGS. 2A and 2B, FIG. 3 and FIG. 4 show the results of using calibrations according to various embodiments of the invention.

FIG. 2A shows residuals obtained in simulation when a mobility only calibration of the form of Eq. 3 is created using a mixture of polyalanine peptides and tetraalkylammonium salts (dots) and a calibration incorporating mass to charge ratio dependence as in Eq. 4 (squares). The residuals are given as percentage error in the average ion velocity. As can be seen, the residuals are significantly reduced when a calibration of the form of Eq. 4 explicitly involving the mass to charge ratio m/q is used (squares).

Figure 2B:
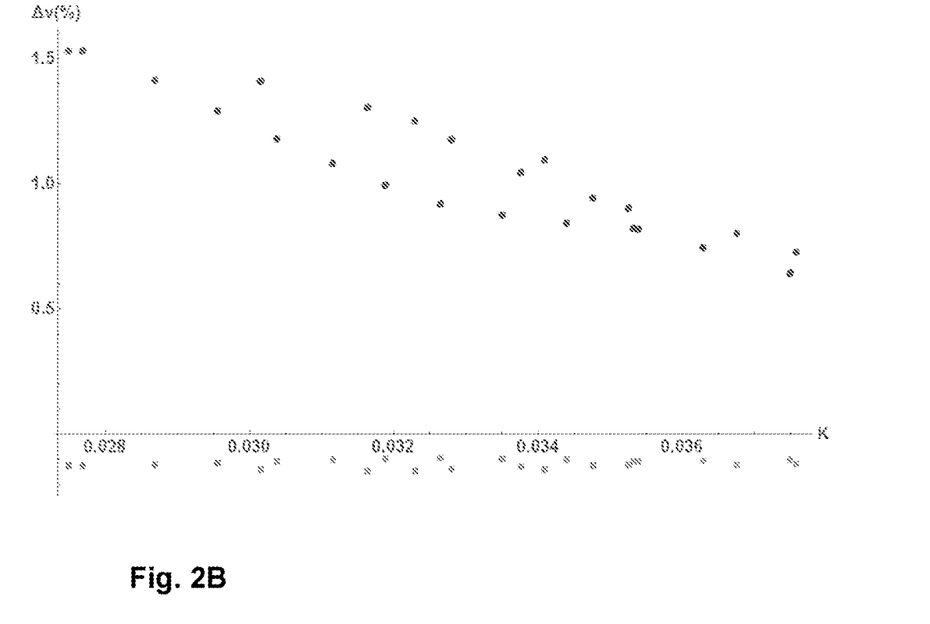

FIG. 2B shows a plot corresponding to that of FIG. 2A, except for denatured proteins. It can be seen that the improved mass to charge dependent calibration (squares) remains accurate to better than 0.2% when applied to a number of denatured proteins, while the original calibration (dots) produces residuals of up to 1.5%.

The form of Eq. 4 is therefore a significantly improved functional form for calibration. This performance cannot be matched simply by including higher powers of K in the expansion of the average ion velocity. It is necessary to include mass to charge dependence in the calibration explicitly. The mass to charge ratio to be used in the calibration may be known a priori, or may be determined during the calibration procedure, e.g. in a hybrid TWIM mass spectrometer. For larger molecules, it may also be necessary to include higher powers of $K^2$ and $(m/q)^2$ in the calibration. For example, keeping all terms to order $K^6$ gives an expression of the form:

$$\bar{v}_{ion} = \quad \text{(Eq. 5)}$$
$$c_2 K^2 + c_{42} K^4 \left(\frac{m}{q}\right)^2 + c_4 K^4 + c_6 K^6 + c_{62} K^6 \left(\frac{m}{q}\right)^2 + c_{64} K^6 \left(\frac{m}{q}\right)^4$$

When the mass to charge dependence becomes sufficiently strong, the perturbative approach described above may break down, and in this case a numerical approach may be adopted to find the transit time or average ion velocity for given ion properties (e.g. mobility and mass to charge ratio) and travelling wave conditions. In other words, for given travelling wave parameters and ion properties, there is an algorithm that will calculate the expected transit time which involves the numerical solution of a differential equation. In coordinates chosen to simplify the problem, the differential equation of motion for a sinusoidal travelling wave is:

$$\alpha \frac{d^2 z}{d\tau^2} = -\frac{dz}{d\tau} - 1 + \gamma \sin z \quad \text{(Eq. 6)}$$

where z=2π/λ(x−μt) and τ=2πμt/λ, where x is measured along the axis of the separation region.

For given α and γ, this equation can be solved (using any standard differential equation solver) for motion from z=0 to z=−2πN, where N is chosen to be sufficiently large to remove dependence on the initial conditions. The value of dz/dτ at z=0 can be set to zero, or an appropriate guess designed to reduce the value of N that is required. The period Δτ of the final roll-over event from z=−2π(N−1) to z=−2πN can then be determined in terms of the coordinate τ. N may be selected by demanding convergence of the calculated value of Δτ to within a predefined tolerance as N is increased. The required transit time is then given by:

$$T = \frac{L \Delta T}{2\pi\mu} \quad \text{(Eq. 7)}$$

Alternatively, the final M roll-over events may be used.

Except that the calculation of Δτ involves a numerical step, this is conceptually no different from the analytic approach described above. Note that Δτ is a function of both ion mobility K and mass to charge ratio m/q through the dependence of Eq. 6 on the parameters α and γ. It will be appreciated that the same approach can also be adopted for non-sinusoidal waveforms which will involve numerical solution of a different differential equation to that shown in Eq. 6.

It will be appreciated that the above equations may also be further modified as appropriate. For instance, equations with more powers of K and/or (m/q) may also be used, e.g. in conditions for which some ions have relatively high values of $\alpha$ and/or $\gamma$.

If the properties of the TWIMS device are known accurately, or if the device has been adequately calibrated as described above to determine (i.e. fit) coefficients $c_2$, $c_{42}$ etc., then for an unknown analyte the equation for the transit time or average ion velocity of an ion, e.g. as given by the appropriate equation above, contains only two unknowns, i.e. the mass to charge ratio of the ion and its ion mobility. It therefore follows that if the mass to charge ratio of the ion is known, the mobility K of the ion can then be inferred by selecting the appropriate equation for the transit time or average ion velocity, and then solving the selected equation numerically given the measured value of transit time or average ion velocity and the known mass to charge ratio. The mass to charge ratio of the ion may be determined, for example, using a mass spectrometer upstream or downstream of the ion mobility separation region.

Similarly, if the ion mobility K is known, then the mass to charge ratio of the ion can be determined by solving the appropriately selected equation numerically.

If both the mass to charge ratio and ion mobility of the ion are unknown, then two measurements of the transit time or average ion mobility may be performed under different operating conditions so as to provide two different equations for the transit time or average ion velocity, e.g. having, but known, $\alpha$ and $\gamma$ values, or a different set of calibrated parameters $c_2$, $c_{42}$, etc. These two equations may then be solved simultaneously so as to give both the mass to charge ratio and ion mobility of the ion.

In another embodiment, a first measurement may be obtained under conditions in which the transit time or average ion velocity is primarily dependent on the ion mobility of the ion (i.e. under conditions in which the value of a is low), and a second measurement may be performed under conditions in which the transit time or average ion velocity has a significant dependence on both mobility and mass to charge ratio. The first measurement may then be used to determine the mobility K of the ion, and this value of mobility K may then be used in an appropriately selected one of the above equations, along with the second measurement in order to determine the mass to charge ratio of the ion.

As an alternative to using the explicitly calibrated forms such as Eq. 4 or Eq. 5, if the device is not sufficiently well characterized, then the transit times or average ion velocities of calibration standard ions having known mass to charge ratios and ion mobilities may be used to determine some or all of the constants in the above equations. For example, the constants $\mu/L$, $\mu/\lambda$ and $V_0/(\mu\lambda)$ appearing in Eq. 1 or Eq. 2, or the constants $c_n$ appearing in Eq. 3, Eq. 4 or Eq. 5, may be determined or refined using experimental measurements of calibration standard ions.

To further improve the measured values of mobility and/or mass to charge ratio, or to provide confirmation of the value or values measured in this way, experimental measurements of transit time or average ion velocity may be made using three or more sets of operating conditions.

A Bayesian approach may be applied for determining the mobility and/or mass to charge ratio. For instance, the mobility and/or mass to charge ratio and corresponding uncertainties may be determined by calculating and finding the maximum of, or sampling from, a probability distribution for ion mobility and/or mass to charge ratio based on the data.

Various modifications to the above equations are contemplated. For example, although the potential wells have been described above as being in the form of sinusoidal waves that move smoothly and continuously through the separation region at a constant velocity, it is contemplated that Eq. 1 and Eq. 2 above may be modified for a TWIMS device in which the wave position is stepped in time, rather than moving smoothly and continuously, and/or in which the waveform is non-sinusoidal. For instance, it has been shown through simulation that the calibrated equations above (Eq. 4 and Eq. 5) are sufficiently flexible to accommodate wave stepping.

Nearly sinusoidal waves are well described by truncated expansions of the form:

$$E(X) = E_0(X) + \alpha_1 E_1(X) + \alpha_2 E_2(X) + \quad \text{(Eq. 8)}$$

where $$E_n(X) = k V_0 (2n+1) \sin((2n+1)kX)$$

and $k=2\pi/\lambda$, $V_0$ is the amplitude of the travelling wave potential, and the coefficients $a_n$ rapidly become smaller as n increases.

Keeping terms up to order $a_1$ $\alpha^4$ and $a_2$ $\alpha^2$ the average ion velocity can then be written as:

$$\begin{aligned}
v_{ion} = \\
v(1-\omega_0)\bigg[ &1 - \omega_0^2 \alpha^2 - \omega_0^2(2 + 3\omega_0 - 6\omega_0^2)\alpha^4 - 3\alpha_1 \frac{(1-\omega_0)(1+3\omega_0)}{1+\omega_0} \\
&\left( \frac{1}{\omega_0} + (2-3\omega_0)\alpha^2 + (4+3\omega_0 - 22\omega_0^2 + 30\omega_0^3)\alpha^4 \right) + \\
&9a_1^2 \frac{1}{2\omega_0(1+\omega_0)^2}\bigg( \frac{1+3\omega_0 + 11\omega_0^2 - 7\omega_0^3}{\omega_0^2} + \\
&(3 + 43\omega_0 - 63\omega_0^2 - 97\omega_0^3 + 96\omega_0^4 - 54\omega_0^5)\alpha^2 \bigg) + \\
&5\alpha_2 \frac{(1-\omega_0)^2(1+5\omega_0)}{(1+\omega_0)^2}\left( \frac{1}{\omega_0} + (2-3\omega_0)\alpha^2 \right) \bigg].
\end{aligned}$$
(Eq. 9)

It will be clear that this process can be continued to include higher order wave shape corrections and higher order relaxation effects and combinations of these.

In the calibration expansions Eq. 3 and Eq. 4, the mobility K may be replaced by $1/\Omega_r$, where $\Omega_r = (\sqrt{\mu/q})\Omega$, where $\mu$ here is the reduced mass of the mass of the ion (m) and the mass of a gas molecule ($m_g$) of the gas in the separation device, i.e.

$$\mu = \frac{m m_g}{m + m_g},$$

and where $\Omega$ is the collisional cross section of the ion. This replacement is particularly useful, for example, when the temperature and/or pressure in the gas cell are not precisely known but the collisional cross section of the ion $\Omega$ has been determined previously.

Alternatively, or additionally, it is contemplated that the equations presented above may be modified for a TWIMS device in which the wave amplitude and/or velocity varies during the ion separation time. Wave amplitude and velocity ramping are often used to increase the range of mobilities that can be measured in a single experiment. As an example, when wave amplitude is allowed to change linearly during the experiment, it can be shown that in the absence of velocity relaxation effects, Eq. 3 may be replaced by a calibration of the form:

$$\bar{v}_{ion} = c_2 K^{2/3} + c_4 K^{4/3} + c_4 K^{4/3} c_6 K^{6/3} + c_8 K^{8/3} \quad \text{(Eq. 10)}$$

while the simplest functional form which accommodates mass to charge dependent effects in the calibration may be given by:

$$\bar{v}_{ion} = c_2 K^{2/3} + c_4 K^{4/3} + c_6 K^{6/3} + c_8 K^{8/3} + c_{82} K^{8/3} \left(\frac{m}{q}\right)^2 \quad \text{(Eq. 11)}$$

In the above two expressions, terms involving higher powers of $K^{2/3}$ may generally be added as required. In general, terms involving another combination of a power of $K^{1/3}$ and a power of m/q may also or instead appear. Also, as mentioned above, where the mobility K of the calibrant species is not known, the mobility K may be replaced by $1/\Omega_r$ in Eq. 10 and Eq. 11, where $\Omega_r = (\sqrt{\mu/q}) \Omega$, as defined above, with μ being the reduced mass of the ion and Ω the collisional cross section.

The above equations were derived by considering a one dimensional TWIM device in which all ions experience the same travelling wave profile. In a real three dimensional device, however, RF confined ion clouds corresponding to different species may occupy different volumes. In a cylindrically symmetric stacked ring ion guide, for example, the axially averaged confining RF pseudo potential is approximately $$\overline{V^*} = A^2 \frac{\kappa^2 q^2}{8m\Omega^2} \left[ I_1^2(\kappa r) + I_0^2(\kappa r) \right]$$

where A is the applied RF amplitude, K is the wavenumber and Ω here is the angular frequency of the RF, r is the radial position and $I_0$ and $I_1$ are modified Bessel functions of the first kind. The $q^2/m$ dependence of the pseudo potential leads to ions of differing charge and mass occupying differing volumes. For example, the ion clouds corresponding to singly charged small molecules and peptides typically extend significantly further out towards the electrodes than those of native and denatured proteins. This means that they experience, on average, higher travelling wave voltages, leading to a small shift in their average ion velocity.

Because this is not a pure mass to charge dependent effect, a further modification of the calibration may be required to accommodate it. It has been found, for example, that multiplying the expression in Eq. 4 by a term of the form $$e^{cm^a/q^b} \quad \text{(Eq. 12)}$$

where a, b and c are free parameters that can be fitted experimentally, may significantly improve calibrations involving mixtures of the species mentioned above.

One or more of a, b and c may be fixed in advance of making the calibration. For example, b may be fixed to b=1, in which case Eq. 12 becomes $e^{cm^a q}$. The parameters a, b and c can each take any sign, but a and at least one of a and b should be constrained to be non-zero.

Figure 3:
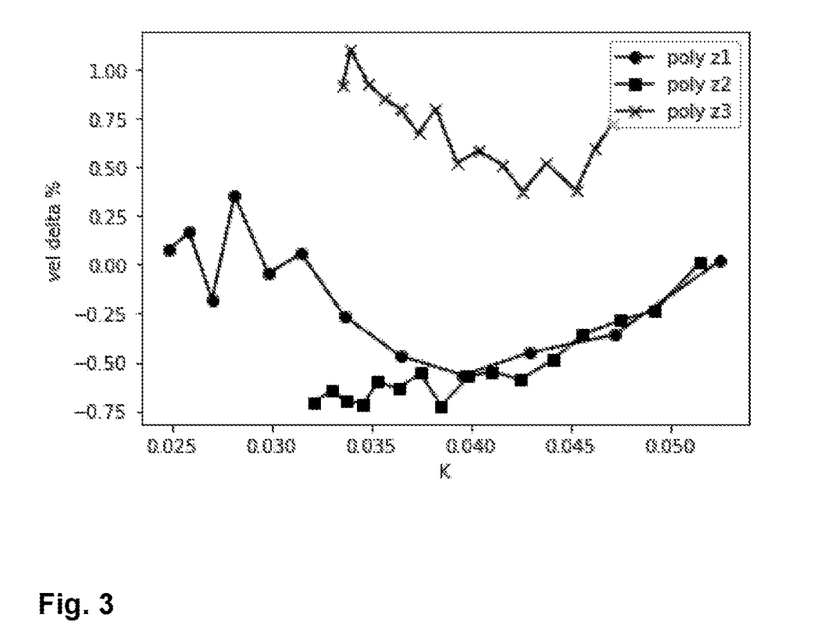
Figure 4:
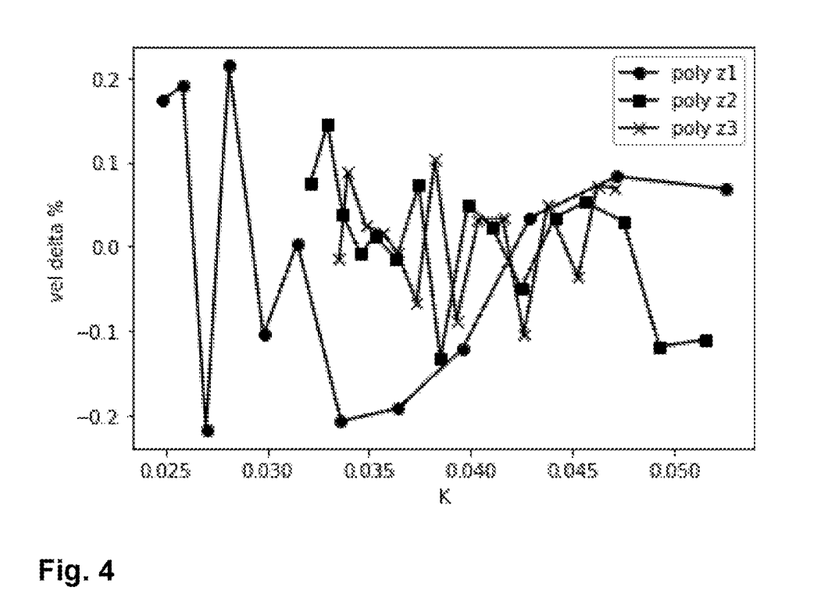

FIG. 3 shows the velocity residuals for simulated calibrations of singly, doubly and triply charged polyalanine ions using a calibration of the form given in Eq. 4. FIG. 4 then shows the velocity residuals in a calibration based on Eq. 4 but modified by a term of the type given in Eq. 12, with b fixed to 1. FIGS. 3 and 4 thus contrast simulated calibrations with and without the modification given in Eq. 12 (with b=1) showing the improved calibration offered by including such a term.

In some pressure and mobility regimes, the radial distribution effects described above (which are dependent on some function of mass and charge and not purely on mass to charge ratio) may even be much larger than the velocity relaxation effects (which are dependent only on mass to charge ratio). Thus, in embodiments, the behaviour of the device may be defined using an equation that relates the transit time or average ion velocity of an ion to the parameters for the device, the ion mobility of that ion and some function of mass and charge that is not necessarily a function of mass to charge ration. For example, in cases where velocity relaxation effects can be ignored, so that there is little mass to charge ratio dependence, the modification shown in Eq. 12 may also be applied to Eq. 3 or any other calibration function (such as a power-law calibration, e.g. as described in B. T. Ruotolo, K. Giles, I. Campuzano, A. M. Sandercock, R. H. Bateman, C. V. Robinson, Science 310 1658 (2005)) and used either for calibrating the device or for determining ion mobility or mass and charge of an ion.

For instance, since Eq. 12 is sensitive to both mass and charge, if the calibration is sufficiently good then given sufficiently many measurements of an unknown analyte ion under different operating conditions it should be possible to obtain estimates for both the mass and charge of the ion (and not just their ratio). Thus, in embodiments, a plurality of measurements can be performed on an analyte ion using different operating conditions and an equation including a modification of the type shown in Eq. 12 may be used to determine the mass and charge of the analyte ion. Since this part of the calibration is also sensitive to the confining RF voltage and/or frequency, it may be beneficial to include different values of either or both of these parameters in the set of conditions used.

Alternatively, or additionally, if independent measurements of either the mass or the charge of the ion can be made, these can be used in combination with the determined or measured mass to charge ratio to estimate the other of the mass or the charge. For example, an algorithm or relationship can be defined that relates the mass of an analyte ion to the ion mobilities of that analyte ion through three gases of different polarisabilities. By measuring the ion mobilities of an analyte ion through three or more gases of different polarisability, the mass of the analyte ion can then be determined using this algorithm or relationship. That is, by determining the ion mobilities of the same analyte ion in three different gases, the mass of the analyte ion can be determined without having to know the specific properties of the analyte ion (such as the ion radius, etc.). This technique is generally described in United Kingdom Patent No. 2539538 (MICROMASS UK LIMITED). In this way, the mass of an ion can be determined independently of the measurement of its mass to charge ratio according to the present techniques and in turn used to determine the charge of the ion.

In the technique as described in United Kingdom Patent No. 2539538 the measurements may be performed using a drift tube device, and the measurements are performed using three different gases because there are essentially only three unknowns in that case (i.e. an effective ion radius, polarization coefficient and mass of the analyte ion). Thus, when the effective ion radius and polarisation coefficient are unknown, at least three different measurements are required in order to determine the mass. However, it will be appreciated that when such techniques are performed in a TWIM device under conditions in which velocity relaxation are significant, so that there is an additional unknown (i.e. mass to charge ratio), the techniques may need to be modified accordingly. For instance, because there are now four unknowns, it may be necessary to perform at least four different measurements. To account for this, two or more measurements may be performed with the same gas whilst using under two different sets of operating conditions of the device (such as different travelling wave forms), and then further measurements can be performed with a different gas (and optionally also whilst using different operating conditions). In this way, it is possible to further improve the calibration of the device to account for other mass and charge dependent effects, or to allow a determination of the mass and charge of the ions as well as the mass to charge ratio, etc. Indeed, generally, when a TWIM device has been sufficiently characterised, by performing multiple measurements in the device using two, three or more different gases under several different sets of operating conditions it is possible to obtain additional useful information about the analyte ions.

The equations presented above may also be modified to accommodate a TWIMS device in which high field mobility effects become significant.

It will be appreciated that the above considerations apply to other (e.g. non-cylindrical) travelling wave form factors such as those based on structures for lossless ion manipulations (SLIM) described in Hamid et al. *Anal. Chem.* 2015, 87, 11301-11308.

As described above, in trapped ion mobility spectrometry (TIMS) device, a gas flow urges ions in a first direction and a DC electric field is applied in the opposite direction so as to hold ions stationary against the moving gas flow in a first region (also known as a "parking region"). Ions are initially trapped in this region by the opposing forces due to the gas flow and the electric field. In this embodiment the electric field spatially varies in a linear manner along the first region. After an ion accumulation period, further ions may be prevented from entering the first region. The magnitude of the linearly varying electric field is then decreased with time, e.g. by scanning or stepping. As the force on the ions due to the gas flow depends on the mobility of the ions, decreasing the electric field with time results in the ions eluting from the first region in reverse order of mobility (i.e. in order of low to high mobility). In this embodiment the ions elute from the first region into a second region having a spatially constant electric field of a magnitude that decreases with time, also known as a "plateau region".

The time $t_e$ it takes an ion to traverse the first region is given by:

$$t_e = \frac{1}{\beta}\left(E_0 - \frac{v_g}{K}\right)$$

where $\beta$ is the rate of change of the electric field in the second region, $E_0$ is the initial value of the electric field in the second region, and $v_g$ is the velocity of the gas flow.

Explicitly taking into account the changing electric field, the time $t_p$ taken for an ion to traverse the first region satisfies the following equation:

$$L_p = \beta K[1/2 t_p^2 - \alpha' t_p + \alpha'^2 (1 - e^{-t_p/\alpha'})]$$

where $L_p$ is the length of the second region and $\alpha'$ is the relaxation timescale, where $\alpha' = K$ m/q. For values of $t_p \gg \alpha'$, the above equation can be rearranged to give:

$$t_p = \alpha' + \sqrt{\frac{2L_p}{\beta K} - \alpha'^2}$$

The total transit time across both the first and second regions is given by $T = t_e + t_p$, which gives the following equation:

$$T = \frac{1}{\beta}\left(E_0 - \frac{v_g}{K}\right) + \alpha' + \sqrt{\frac{2L_p}{\beta K} - \alpha'^2} \qquad \text{(Eq. 13)}$$

In an analogous manner to that already described for TWIMS, for sufficiently well characterised systems, Eq. 13 can be used to determine either mass to charge ratio given ion mobility, or ion mobility given mass to charge ratio. Alternatively, if two measurements are performed under different conditions, mass to charge ratio and ion mobility may be measured simultaneously by simultaneously solving two copies of Eq. 13 obtained using the different conditions.

For instance, if the properties of the TIMS device are known accurately, then for an unknown analyte the transit time T of an ion given by the equation above contains only two unknowns, i.e. the mass to charge ratio of the ion and its ion mobility. It therefore follows that if the mass to charge ratio of the ion is known, then the mobility K of the ion can be inferred by solving the above equation for T numerically. The mass to charge ratio of the ion may be determined, for example, using a mass spectrometer upstream or downstream of the ion mobility separation region. Conversely, if the ion mobility K is known, then the mass to charge ratio of the ion can be determined by solving the above equation for T numerically. If both the mass to charge ratio and ion mobility of the ion are unknown, then two or more measurements of the transit time T may be performed under two or more different conditions, so as to provide two or more equations based on the above equation for T. These two or more equations may then be solved simultaneously so as to give both the mass to charge ratio and ion mobility of the ion.

In another embodiment, a first measurement may be obtained under conditions in which the transit time is primarily dependent on the ion mobility of the ion, and a second measurement may be performed under conditions in which the transit time has a significant dependence on both mobility and mass to charge ratio. The first measurement may then be used to determine the mobility K of the ion, and this value of mobility K may then be used in the above equation for T, along with the second transit time measurement in order to determine the mass to charge ratio of the ion.

If the device is not sufficiently well characterized, then the transit times T of calibration standard ions having known mass to charge ratios and ion mobilities may be used to determine some or all of the constants in the above equation for T (Eq. 13). For example, the constants $E_0/\beta$, $v_g/\beta$ and $L_p/\beta$ may be determined or refined using Eq. 13.

It will also be appreciated that, in a similar manner described above in relation to TWIM, rather than using the form shown in Eq. 13, an equation relating the average ion velocity of an ion to a power series in ion mobility and/or mass to charge ratio may be derived, with the coefficients of the power series either being determined analytically or more typically being fitted experimentally as part of a calibration process. Also, since the ions within a TIMS device will also typically be subject to RF radial confinement, a similar correction as shown in Eq. 12 may be used in order to account for mass and charge dependent radial distribution effects.

Thus, although the present invention has been described with reference to preferred embodiments, it will be understood by those skilled in the art that various changes in form and detail may be made without departing from the scope of the invention as set forth in the accompanying claims.

For example, higher order corrections to any of equations presented above may be determined analytically and used as described above. For example, the resulting expressions may be used for determining the ion mobility K and/or mass to charge ratio of an ion, and/or for instrument calibration.

The ion mobility separation device described herein may form part of a tandem ion mobility mass spectrometer, in which case the mass to charge ratio value used in the equations presented above may be that determined by the tandem mass spectrometer.

Various modifications to the equations presented above are contemplated. For example, modification to the equations may be made to account for mass to charge ratio and/or mobility dependent transit times prior to, or after, the TWIM or TIMS separation region.

Furthermore, although embodiments of TWIMS and TIMS devices have been described above, corresponding equations may be derived for other ion mobility separation devices in which the electric field varies with time in order to determine the mass to charge ratio and/or ion mobility of an ion transmitted therethrough or, if the device is not sufficiently well characterized, to determine operational constants of the device.

The invention claimed is:

1. A method of ion mobility and/or mass spectrometry comprising:
providing an ion separation device in which one or more time-varying electric field is used to separate ions passing therethrough such that the ions exit the ion separation device at different times;
providing an algorithm or relationship that relates the transit time or average ion velocity of any given ion through the ion separation device to one or more parameters for the device, the mass to charge ratio of that ion and the ion mobility of that ion;
measuring the transit time or average ion velocity of an ion through the ion separation device; and
(i) determining the ion mobility of said ion from said algorithm or relationship by using the measured transit time or average ion velocity of the ion, a known mass to charge ratio of the ion, and known parameters for the device; or
(ii) determining the mass to charge ratio of said ion from said algorithm or relationship by using the measured transit time or average ion velocity of the ion, a known ion mobility of the ion, and known parameters for the device; or
(iii) wherein said measuring the transit time or average ion velocity of the ion through the ion separation device is performed whilst using a first set of operating conditions of the device associated with first known parameter values to obtain a first transit time or average ion velocity, and wherein the method further comprises measuring a second transit time or average ion velocity of the ion through the ion separation device whilst using second, different operating conditions of the device associated with second known parameter values, and determining both the ion mobility and mass to charge ratio of said ion from said algorithm or relationship by using the measured first and second transit times or average ion velocities and the first and second parameter values.

2. The method of claim 1, comprising measuring the mass to charge ratio of the ion to determine said known mass to charge ratio in step (i); or measuring the ion mobility of the ion to determine said known ion mobility in step (ii).

3. The method of claim 1, wherein step (iii) comprises: determining a first equation relating the first transit time or average ion velocity, the first known parameter values, the ion mobility of the ion, and the mass to charge ratio of the ion; determining a second equation relating the second transit time or average ion velocity, the second known parameter values, the ion mobility of the ion, and the mass to charge ratio of the ion; and solving said first and second equations simultaneously to determine the ion mobility and mass to charge ratio of said ion.

4. A method of calibrating an ion mobility and/or mass spectrometer comprising:
providing an ion separation device in which one or more time-varying, electric field is used to separate ions passing therethrough such that the ions exit the ion separation device at different times;
providing an algorithm or relationship that relates the transit time or average ion velocity of any given ion through the ion separation device to one or more parameters for the device, the mass to charge ratio of that ion or a function of mass and charge of that ion, and the ion mobility of that ion;
measuring the transit time or average ion velocity of an ion through the ion separation device; and
determining the parameter values for the device from said algorithm or relationship by using the measured transit time or average ion velocity of the ion, a known ion mobility of the ion, and a known mass to charge ratio of the ion or a known value of the function of mass and charge of the ion.

5. The method of claim 1, wherein the ion separation device is a travelling wave separation device, wherein voltages are successively applied to electrodes of the device so as to form a wave of potential barriers that move in a first direction along the device so as to urge ions in the first direction through a gas.

6. The method of claim 5, wherein said algorithm or relationship is, or comprises a term of the form:

$$T = \frac{L}{\mu(1 - \omega_0 - \alpha^2 \omega_0^2 (1 - \omega_0))}$$

where T is the transit time of any given ion through the ion separation device, L is the length of the ion separation region in the device, μ is the velocity in the first direction of the potential barriers, $$\omega_0 = \sqrt{1 - \gamma^2},$$

$$\alpha = \frac{2\pi\mu}{\lambda} K \frac{m}{q},$$

$$\gamma = \frac{2\pi V_0}{\mu\lambda} K,$$

$V_0$ is the amplitude of each potential barrier, λ is the wavelength between adjacent potential barriers of said wave of potential barriers, K is the ion mobility of the ion, and m/q is the mass to charge ratio of the ion.

7. The method of claim 4, wherein the ion separation device is a travelling wave separation device, wherein voltages are successively applied to electrodes of the device so as to form a wave of potential barriers that move in a first direction along the device so as to urge ions in the first direction through a gas;

said algorithm or relationship is, or comprises a term of the form:

$$T = \frac{L}{\mu\left(1 - \omega_0 - \alpha^2\omega_0^2(1 - \omega_0)\right)}$$

where T is the transit time of any given ion through the ion separation device, L is the length of the ion separation region in the device, μ is the velocity in the first direction of the potential barriers, $$\omega_0 = \sqrt{1 - \gamma^2},$$
$$\alpha = \frac{2\pi\mu}{\lambda}K\frac{m}{q},$$
$$\gamma = \frac{2\pi V_0}{\mu\lambda}K,$$

$V_0$ is the amplitude of each potential barrier, λ is the wavelength between adjacent potential barriers of said wave of potential barriers, K is the ion mobility of the ion, and m/g is the mass to charge ratio of the ion; and the step of determining the parameters for the device comprises determining one or more operational parameters for the device such as: μ; L; λ; $V_0$; μ/L; μ/λ; or $V_0/(\mu\lambda)$.

8. The method of claim 5, wherein said algorithm or relationship is, or comprises a term of the form:

$$\bar{v}_{ion} = c_2 K^2 + c_{42} K^4 \left(\frac{m}{q}\right)^2 + c_4 K^4 + c_6 K^6$$

or
wherein said algorithm or relationship is:

$$\bar{v}_{ion} = c_2 K^{2/3} + c_4 K^{4/3} + c_6 K^{6/3} + c_8 K^{8/3} + c_{82} K^{8/3}\left(\frac{m}{q}\right)^2$$

where $v_{ion}$ is the average ion velocity through the separation device defined by the length L of the ion separation region in the separation device divided by the transit time T of any given ion through the ion separation region; $c_0$ are constants; K is the ion mobility of the ion, and m/q is the mass to charge ratio of the ion.

9. The method of claim 4, wherein the ion separation device is a travelling wave separation device, wherein voltages are successively applied to electrodes of the device so as to form a wave of potential barriers that move in a first direction along the device so as to urge ions in the first direction through a gas;

said algorithm or relationship is, or comprises a term of the form:

$$\bar{v}_{ion} = c_2 K^2 + c_{42} K^4 \left(\frac{m}{q}\right)^2 + c_4 K^4 + c_6 K^6;$$

or
wherein said algorithm or relationship is:

$$\bar{v}_{ion} = c_2 K^{2/3} + c_4 K^{4/3} + c_6 K^{6/3} + c_8 K^{8/3} + c_{82} K^{8/3}\left(\frac{m}{q}\right)^2$$

where $v_{ion}$ is the average ion velocity through the separation device defined by the length L of the ion separation region in the separation device divided by the transit time T of any given ion through the ion separation region; $c_0$ are constants; K is the ion mobility of the ion, and m/q is the mass to charge ratio of the ion; and the step of determining the parameters for the device comprises determining the constants $c_n$.

10. The method of claim 1, wherein the ion separation device is a trapped ion mobility separation device, wherein a gas flow urges ions in one direction, and a first electric field urges the ions in the opposite direction so as to trap the ions in a first region, and the first electric field is varied with time so that different ions exit the first region at different times, optionally wherein the ions exit the first region at different times into a second region in which a second electric field is maintained, wherein the second electric field is varied with time.

11. The method of claim 10, wherein said algorithm or relationship is, or comprises a term of the form:

$$T = \frac{1}{\beta}\left(E_0 - \frac{v_g}{K}\right) + \alpha' - \sqrt{\frac{2L_p}{\beta K} - \alpha'^2}$$

where T is the transit time of any given ion through the ion separation device, β is the rate of change of the second electric field in the second region, $E_0$ is the initial value of the second electric field in the second region, $v_g$ is the velocity of the gas flow, K is the ion mobility of the ion, α' is the product of the ion mobility and mass to charge ratio of the ion, and $L_p$ is the length of the second region.

12. The method of claim 4, wherein the ion separation device is a trapped ion mobility separation device, wherein a gas flow urges ions in one direction, and a first electric field urges the ions in the opposite direction so as to trap the ions in a first region, and the first electric field is varied with time so that different ions exit the first region at different times, optionally wherein the ions exit the first region at different times into a second region in which a second electric field is maintained, wherein the second electric field is varied with time;

said algorithm or relationship is, or comprises a term of the form:

$$T = \frac{1}{\beta}\left(E_0 - \frac{v_g}{K}\right) + \alpha' - \sqrt{\frac{2L_p}{\beta K} - \alpha'^2}$$

where T is the transit time of any given ion through the ion separation device, $\beta$ is the rate of change of the second electric field in the second region, $E_0$ is the initial value of the second electric field in the second region, $v_g$ is the velocity of the gas flow, K is the ion mobility of the ion, $\alpha'$ is the product of the ion mobility and mass to charge ratio of the ion, and $L_p$ is the length of the second region; and the step of determining the parameters for the device comprises determining one or more operational parameters for the device such as: $E_0$; $\beta$; $v_g$; $L_p$; $E_0/\beta$; $v_g/\beta$; or $L_p/\beta$.

13. The method of claim 1, wherein the algorithm or relationship further relates the transit time or average ion velocity of any given ion through the ion separation device to a function of mass and charge of the ion, or to the mass and charge of the ion.

14. The method of claim 13, wherein the algorithm or relationship relating the transit time or average ion velocity of any given ion through the ion separation device to the mass and charge of the ion includes a term of the form $e^{cm^a/q^b}$, wherein m is the mass of the ion, q is the charge of the ion and a, b and c are free parameters.

15. The method of claim 1, further comprising determining the mass of the ion additionally to the determination of the mass to charge ratio, and using the determined mass in combination with the mass to charge ratio to determine the charge of the ion.

16. The method of claim 15, wherein determining the mass of the ion comprises measuring the ion mobilities for the ion through three or more gases of different polarisability and determining the mass of the ion using a relationship or algorithm relating the measured ion mobilities for the three or more gases to the mass of the ion.

17. The method of claim 1, wherein step (iii) comprises performing measurements with two or more different gases in the device, wherein the measurements performed with at least one of the gases are performed using different operating conditions of the device.

18. A method of ion mobility and/or mass spectrometry comprising:
providing an ion separation device in which one or more time-varying electric field is used to separate ions passing therethrough such that the ions exit the ion separation device at different times;
providing an algorithm or relationship that relates the transit time or average ion velocity of any given ion through the ion separation device to one or more parameters for the device, the ion mobility of that ion and a function of mass and charge of that ion;
measuring the transit time or average ion velocity of an ion through the ion separation device; and
(i) determining the ion mobility of said ion from said algorithm or relationship by using the measured transit time or average ion velocity of the ion, a known value of the function of mass and charge of the ion, and known parameters for the device; or
(ii) determining a value of the function of mass and charge of said ion from said algorithm or relationship by using the measured transit time or average ion velocity of the ion, a known ion mobility of the ion, and known parameters for the device; or
(iii) wherein said measuring the transit time or average ion velocity of the ion through the ion separation device is performed whilst using a first set of operating conditions of the device associated with first known parameter values to obtain a first transit time or average ion velocity, and wherein the method further comprises measuring a second transit time or average ion velocity of the ion through the ion separation device whilst using second, different operating conditions of the device associated with second known parameter values, and determining both the ion mobility and a value for the function of mass and charge of said ion from said algorithm or relationship by using the measured first and second transit times or average ion velocities and the first and second parameter values.

19. An ion mobility and/or mass spectrometer comprising:
an ion separation device comprising electrodes, at least one voltage supply connected to the electrodes for generating one or more electric field in the device, and an ion detector;
a memory for storing an algorithm or relationship that relates the transit time of any given ion through the ion separation device to operational parameters for the device, the mass to charge ratio of that ion or a function of mass and charge of that ion, and the ion mobility of that ion;
a processor having access to said memory; and
a controller configured to perform a method as claimed in claim 1.

20. An ion mobility and/or mass spectrometer comprising:
an ion separation device comprising electrodes, at least one voltage supply connected to the electrodes for generating one or more electric field in the device, and an ion detector;
a memory for storing an algorithm or relationship that relates the transit time of any given ion through the ion separation device to operational parameters for the device, the mass to charge ratio of that ion or a function of mass and charge of that ion, and the ion mobility of that ion;
a processor having access to said memory; and
a controller configured to perform a method as claimed in claim 4.

21. The method of claim 1, wherein the step of providing an algorithm or relationship comprises an analytic or perturbative approach.

22. The method of claim 4, wherein the step of providing an algorithm or relationship comprises an analytic or perturbative approach.

23. The method of claim 18, wherein the step of providing an algorithm or relationship comprises an analytic or perturbative approach.

* * * * *